Nov. 10, 1964     I. H. LUNDQUIST     3,156,179
PRINT SELECTION MEANS FOR POSTAGE METERING MACHINE
Original Filed March 24, 1959     7 Sheets-Sheet 1

FIG-1

FIG_2

Nov. 10, 1964  I. H. LUNDQUIST  3,156,179
PRINT SELECTION MEANS FOR POSTAGE METERING MACHINE
Original Filed March 24, 1959  7 Sheets-Sheet 5

FIG_12

FIG_13

FIG_14

FIG_15

FIG_16

Nov. 10, 1964  I. H. LUNDQUIST  3,156,179
PRINT SELECTION MEANS FOR POSTAGE METERING MACHINE
Original Filed March 24, 1959  7 Sheets-Sheet 7

FIG_18    FIG_17

FIG_19    FIG_20

United States Patent Office 3,156,179
Patented Nov. 10, 1964

3,156,179
PRINT SELECTION MEANS FOR POSTAGE
METERING MACHINE
Ingemar H. Lundquist, Oakland, Calif., assignor, by mesne assignments, to Friden, Inc., San Leandro, Calif., a corporation of Delaware
Original application Mar. 24, 1959, Ser. No. 801,594, now Patent No. 3,107,854, dated Oct. 22, 1963. Divided and this application Jan. 2, 1962, Ser. No. 163,677
7 Claims. (Cl. 101—91)

This invention relates to postage metering machines having an indicia print head and a town circle print head and more particularly to the setting of the dater dies, as well as the selective adjustment of the dater dies, "Bulk Rate" die and slogan die into and out of printing position within the town circle print head.

This application is a division of my copending application Serial No. 801,594, entitled "Postage Metering Machine," filed March 24, 1959, now Patent No. 3,107,854, issued October 22, 1963.

The object of the persent invention is to provide a rotatable printing member with a plurality of printing dies selectively adjustable to a print or non-print position.

Another object of the present invention is to provide a unitary control means for the selective adjustment of each of a plurality of printing dies in a rotatable printing member to a print or non-print position.

A further object of the present invention is to provide an improved printing drum for a postage metering device by means of which the town circle is printed with each operation of the device and a slogan die, dater dies and "Bulk Rate" die therein may be selectively moved to a print or non-print position.

Another object of the invention is the provision of a key-controlled adjusting mechanism for the dater dies in a print drum of a postage metering device.

Other objects and advantages will appear from the following description of a preferred embodiment as illustrated in the accompanying drawings, in which:

FIG. 13 is a sectional elevational view of the larger control knob for the auxiliary print head, the view being taken on the line 13—13 in FIG. 12;

FIG. 14 is a sectional elevational view of the smaller control knob for the auxiliary print head, the view being taken on the line 14—14 in FIG. 12;

FIGS. 15 and 16 show the developed contour of the cam grooves within the respective large and small control knobs of the auxiliary print head, taken on the arcuate line 15—15 in FIG. 13 and the arcuate line 16—16 in FIG. 14, respectively;

FIG. 17 is a sectional elevational view of the dater die selector mechanism;

Figure 1:
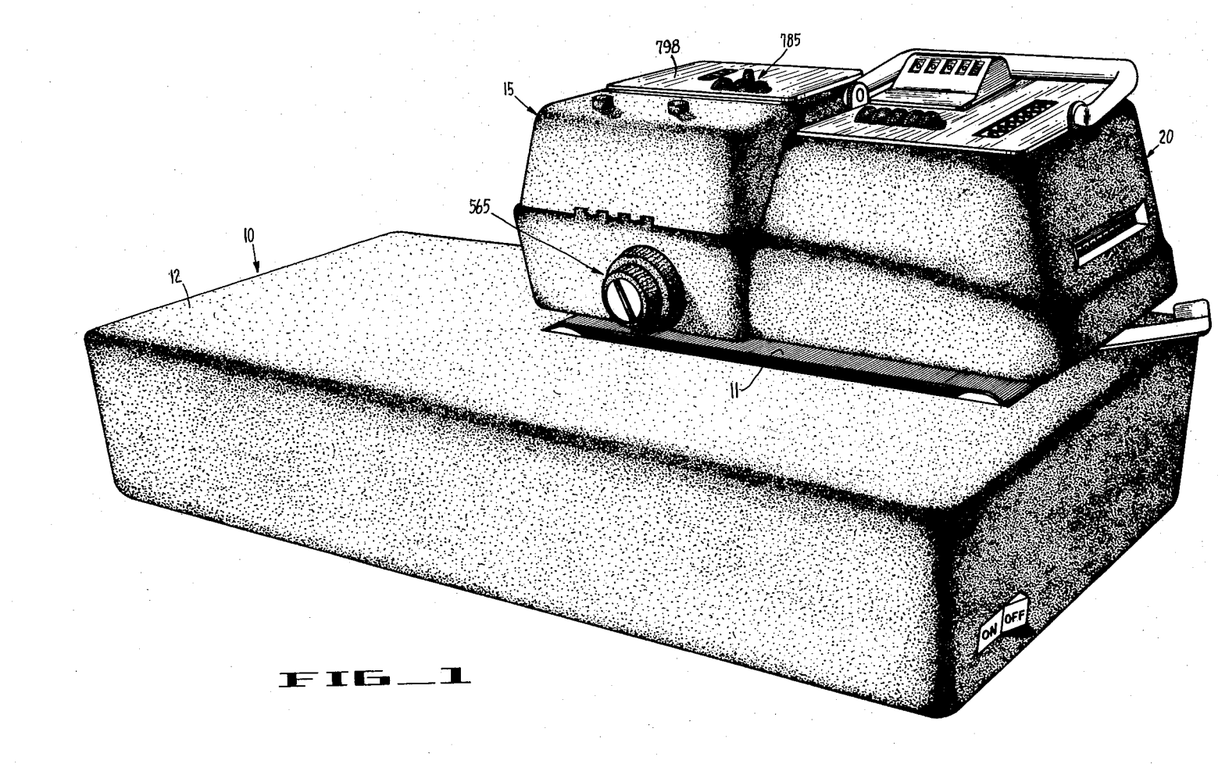
FIG. 1 is a perspective view of the postage metering device.

A postage meter unit, indicated at 20 in FIG. 1, is removably mounted on the cover 12 of the base portion 10 adjacent the housing 15 for engagement with the main drive mechanism and is positioned for cooperation with feed belt 11. Contained within the postage meter unit 20 is the postage indicia print head; a descending register selectively settable only by a post office official to represent the amount of prepaid postage purchased, an ascending register for indicating the total value of postage impressions which have been made, and a postage value selection mechanism for adjusting the numeral type wheels in the indicia print head and for adjusting a registering mechanism to effect the registration of a postage value subtractively in the descending register and additively in the ascending register. In addition to the postage indicia printing head, a second, or auxiliary, printing head is contained within the main drive housing 15 and is provided with a town circle die, dater type wheels, a "Bulk Rate" die and a removable slogan die. The auxiliary print head 565 is cyclically driven directly from the main drive mechanism, which also serves through suitable gearing to impart a synchronous cyclic rotation to the postage indicia printing head.

As stated supra, the auxiliary print head 565 (FIGS. 2, 3, 4 and 5) is driven cyclically in synchronism with the postage indicia print head 160 and is secured on the outer, or forwardly, extended end of shaft 561 beyond the vertical extension 562 of bracket 554. A town circle die 670 is carried by the auxiliary print head 565 and becomes effective to cause an impression of the city and state to be made on mail matter with each cyclic rotation of the head. The auxiliary print head 565 also carries date dies, generally indicated at 671, a "Bulk Rate" die 672 and a slogan die 673, each of which dies may be selectively controlled to cause impressions thereof on mail matter passed through the postage metering device. In addition to the dies 670, 671, 672 and 673, the print head 565 comprises circular end frames 674 and 675 of similar diameter maintained in parallel spaced-apart relation by a substantially U-shaped frame 676. Each end of each of legs 677 and 678 of the U-shaped frame 676 frame is provided with similar projections (not shown) adapted for engagement in corresponding rectangular slots 679 in each of the circular disks, or end frames, 674 and 675, as seen in FIG. 10. The legs 677 and 678 are thereby maintained in parallel planes and are equidistantly spaced from the axis of the shaft 561. The end frames 674 and 675 are keyed on the flatted portion of the shaft 561 (FIGS. 5 and 9) and, with the interposed frame 676, are secured in the position shown by means of a hexagonal nut 681, wherein the outer face of the end frame 674 abuts a shoulder 680 on the shaft.

Figure 4:
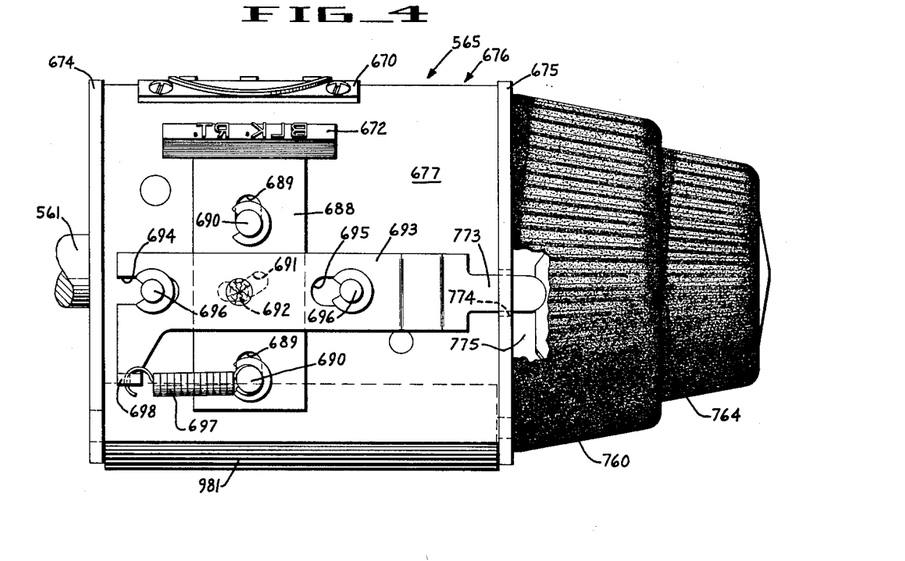
FIG. 4 is an elevational view of the auxiliary print head taken on the line 4—4 in FIG. 3.
Figure 5:
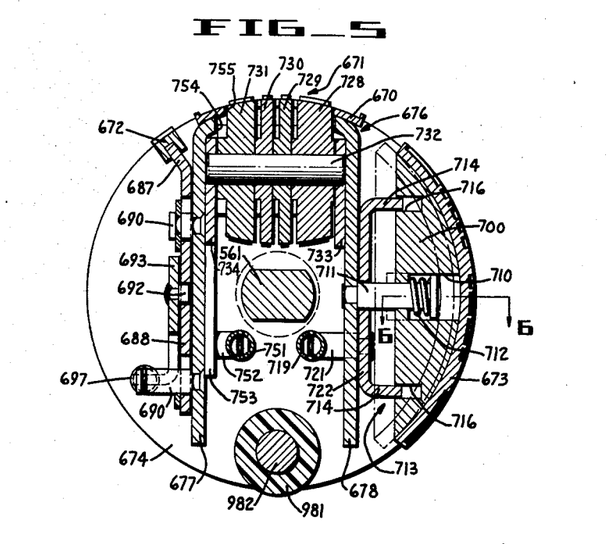
FIG. 5 is a sectional elevational view of the auxiliary print head taken on the plane indicated by line 5—5 in FIG. 3.

The town circle die 670 (FIGS. 3 and 4) is curved to conform with the outer arcuate surface of the web portion 685 of U-shaped frame 676 and is secured thereon by any suitable means, such as screws 686, in a position such that the printing surface of the die 670 extends beyond the periphery of the end frames 674 and 675. The "Bulk Rate" die block 672 is secured on the upper end of a radially disposed extension 687 (FIGS. 4 and 5) of a bar 688 mounted for endwise movement on the outer surface of the leg 677 of U-shaped frame 676 by the engagement of aligned elongated slots 689 with pins 690 on the leg 677. In the upper, or print, position of the "Bulk Rate" die 672, as seen in FIGS. 4 and 5, the printing surface of the die is in the same rotational plane as that of the town circle die 670. For some classifications of mail matter it is necessary that the "Bulk Rate" die 672 be lowered from the print position shown to the non-print position. In order to control the movement of the "Bulk Rate" die from its print to its non-print position, the bar 688 is provided with a camming slot 691 which is in engagement with a pin 692 on a laterally disposed slide 693 mounted for endwise sliding movement at a right angle to the bar 688. Slide 693 is guided in its endwise movement by the engagement of an open end slot 694 and an aligned slot 695 with respective pins 696 secured on leg 677 of U-shaped frame 676. A spring 697 is secured at its one end on an extension of the lower pin 690 and, at its other end, is secured in an aperture in a laterally extended ear 698 of a depending portion of the slide 693 and normally serves to urge slide 693 to the right, as viewed in FIG. 4, thereby retaining the "Bulk Rate" die 672 in its non-print position. The control of the movement of the slide 693 will be described hereinafter.

Figure 3:
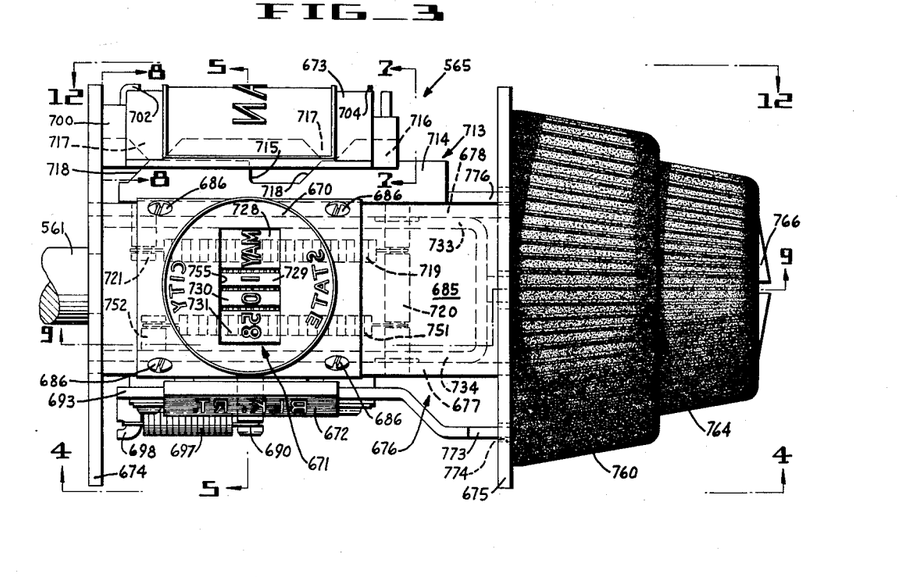
FIG. 3 is a plan view of the auxiliary print head.
Figure 6:
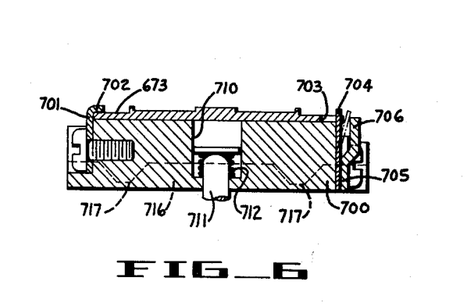
FIG. 6 is a transverse sectional detail of the slogan die taken on the line 6—6 in FIG. 5.
Figure 7:
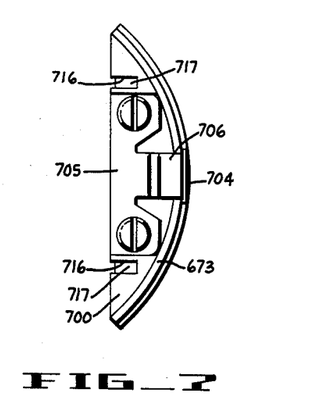
FIG. 7 is a right side elevational view of the slogan die, the view being taken on the line 7—7 in FIG. 3.
Figure 8:
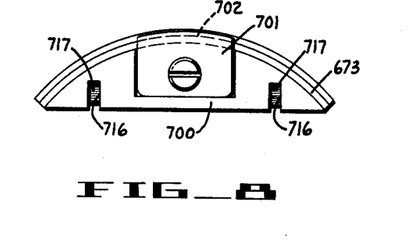
FIG. 8 is a left side elevational view of the slogan die, the view being taken on the line 8—8 in FIG. 3.
Figure 12:
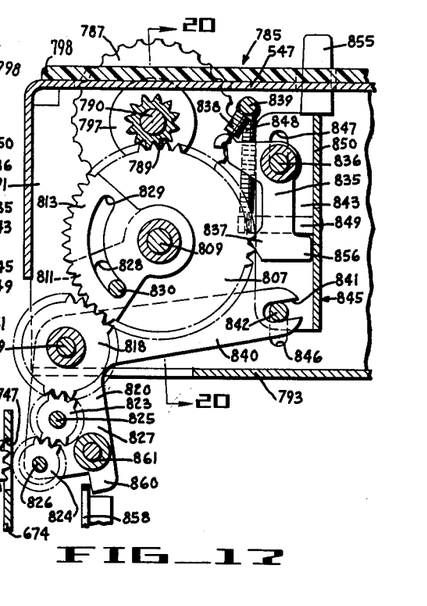
FIG. 12 is an elevational view of the auxiliary print head showing the slogan die, the view being taken on the line 12—12 in FIG. 3.

The slogan die plate 673 is curved to conform with the arcuate surface of a segmental die block 700 and is removably secured thereon (FIGS. 3, 5 and 12). To retain the die plate 673 in position on block 700, a clamp 701 (FIGS. 6, 8 and 12) is secured within a notch at one end of the die block 700 and is provided with an arcuately formed lip 702 overlying one edge portion of the die plate 673. The clamp 701 is located midway of the arcual length of the slogan die plate 673 and is of sufficient width to maintain perfect alignment of the plate 673 with the town circle die 670 and "Bulk Rate" die 672. Intermediate the ends of the die plate 673, a square notch 703 is formed in the curvilinear edge of the plate 673, opposite clamp 701, and is adapted to receive the upper end portion of an inverted T-shaped leaf spring 704 (FIGS. 6, 7 and 12). Opposed lateral projections at the extremity of the upwardly extended leaf of spring 704 overlie the outer surface of the die plate 673, thereby securing the plate in position on the die block 700. The spring 704 is held in the position shown by a similar T-shaped bracket 705, the bar portion of which is secured at its ends on the inner surface of a recess, or notch, formed in the die block 700. The upwardly offset extension 706 of the bracket 705 serves to permit a limited resilient movement of the spring 704, to the position indicated by phantom line in FIG. 6, which is sufficient to release the die plate 673 for removal thereof.

The die block 700 is adjustably secured on the leg 678 of the U-shaped frame 676 for lateral movement from the non-print position, shown in phantom line in FIG. 5, into the printing position shown in full line, wherein the printing surface of the die plate 673 lies in the same rotational plane as the printing surface of the town circle die 670 and the "Bulk Rate" die 672 in the printing position thereof. A counterbored aperture 710, in the outer surface of the die block 700, is centrally located relative to the defining edges of the block and is of a diameter sufficient to receive the head of a radially disposed pin 711. The shank of the pin 711 passes through an aperture of smaller diameter in the bottom of the counterbored aperture 710 concentric therewith and is secured at its end on leg 678 of U-shaped frame 676. The die block 700 and die plate 673 are normally urged to the position indicated by phantom line in FIG. 5 by means of a compression spring 712, bearing at its one end on the bottom of the counterbored aperture 710 and at its other end against the underside of the head of the pin 711.

The movement of the die block 700 and, therefore, die plate 673 from its normal non-print position to the print position, as seen in full line in FIG. 5, is under the control of a channelled slide 713 (FIGS. 3, 5 and 12), which also serves to maintain the chordal surface of the segmental block 700 in a parallel plane with that of the surface of the leg 678 of U-shaped bracket 676. Each of similar parallel flanges 714 of channelled slide 713 is equidistantly spaced from the pin 711 and is adapted for engagement in the corresponding one of a pair of laterally disposed parallel slots 716 in the chordal surface of the segmental die block 700. A pair of substantially V-shaped teeth 717 (FIGS. 3 and 6) are formed in similarly spaced relation within each slot 716 and the edges of each tooth 717 are inclined outwardly toward a point of convergence and terminate in a flat surface parallel with the chordal surface of the die block 700. At its left end, each of the flanges 714 (FIG. 3) is notched to form an inclination 718 and a similar inclination 718 is formed at the right end of an indentation 715 provided in each flange 714 intermediate the ends thereof. The length of each inclination 718 and the angularity thereof is identical to that of the right edge of the corresponding teeth 717 and cooperate therewith to cam the die plate 673 outwardly to the printing position upon movement of the slide 713 to the position shown in FIG. 3. The channelled slide 713 is normally urged to the right (FIG. 3) by a spring 719, secured at its one end on a shaft 720 which is supported at its ends, respectively, in legs 677 and 678 of the U-shaped frame member 676. At its other end, spring 719 is supported on a stud 721 (FIGS. 3 and 5) which is secured to the web portion 722 of the slide 713 and extends through an elongated slot (not shown) in the leg 678 of frame 676. The shank of the pin 711, supporting the die block 700, extends through an elongated slot 723 (FIG. 12) in the web portion 722 of the slide 713 and serves jointly with the engagement of the stud 721 in the elongated slot in the leg 678 to guide the channelled slide 713 in its endwise movement. As the slide 713 is moved to the right (FIG. 3), the compression spring 712 (FIG. 5) urges the slogan die plate 673 to its non-print position wherein the bottom surface of each of the slots 716 bears against the upper edge of the corresponding flanges 714, and the inclinations 718 are in contact with the inclined right edge of the corresponding teeth 717 formed within the slot 716. The engagement of the flanges 714 (FIG. 12) in the corresponding slots 716 serve also, by the retention of the right end of the die block 700 in contiguity with the inner surface of the end frame 674, to assure arcuate rotational alignment of the slogan die plate 673.

The dater die unit 671 comprises a month type wheel 728, a day tens numeral type wheel 729, a day units numeral type wheel 730 and a year numeral type wheel 731 (FIGS. 3 and 10). The months of the year are embossed on the peripheral surface of the month type wheel 728 in equiangularly spaced relation, the numerals "1" to "3" are embossed on the day tens type wheel 729, the numerals "1" to "0" are embossed on the day units type wheel 730 and, in the embodiment shown, the numerals "58" to "69" are embossed on the peripheral surface of the year type wheel 731. The numerals on each of the wheels 729 to 731, inclusive, are angularly spaced on the peripheral surfaces thereof in accordance with the angular spacing of the months on the type wheel 728. Each of the type wheels 728 to 731, inclusive, carries a twelve-tooth gear 737 and the wheels are adjacently mounted for rotation on a shaft 732 secured at its ends in the parallel arms 733 and 734, respectively, of a yoke, or carriage, 735 (FIGS. 10 and 11). The type wheels 728 to 731, inclusive, may be selectively adjusted for the printing of the desired month, day and year and are thereafter resiliently maintained in their adjusted position.

For this purpose, each of the twelve-tooth gears 737, except the gear 737 carried by the year type wheel 731, meshes with a corresponding twenty-tooth gear 746 (FIGS. 9, 10 and 11) rotatably mounted on a shaft 736 which is parallel with shaft 732 and is secured at its respective ends in legs 677 and 678 of the U-shaped frame member 676. A portion of each of the gears 746 extends into a suitable aperture 747 within the end frame 674 of the auxiliary print head 565 for control by a selectively settable mechanism which is effective to adjust the type wheels 728 to 730, inclusive, as will be described hereinafter under the heading "Dater Dies Selection Mechanism." Inasmuch as the year type wheel 731 is adjusted but once a year, the adjustment thereof is accomplished by the use of a stylus. Following the selective adjustment of each of the date type wheels 728 to 731, inclusive, the V-shaped nose 740 on the upwardly extended arm of each pawl of a series of pawls 738 engages between adjacent teeth of the corresponding gear 737. The detent pawls 738 are rockably mounted on a shaft 739 secured at its ends in the arms 733 and 734, respectively, of the carriage 735 and each pawl is urged by an associated spring 741 in a counter-clockwise direction (FIG. 9) to resiliently retain the corresponding gear 737 in its adjusted position.

Figure 9:
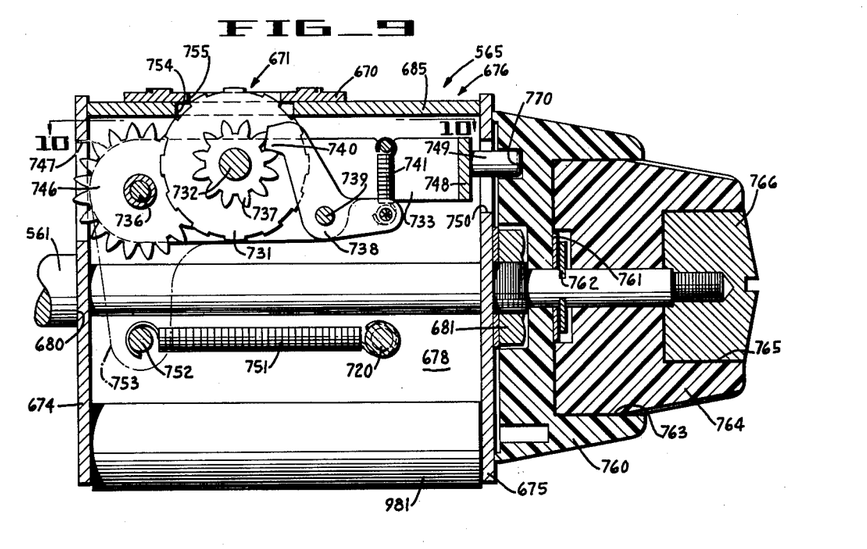
FIG. 9 is a longitudinal sectional view of the auxiliary print head, the view being taken on the lines 9—9 in FIG. 3.
Figure 10:
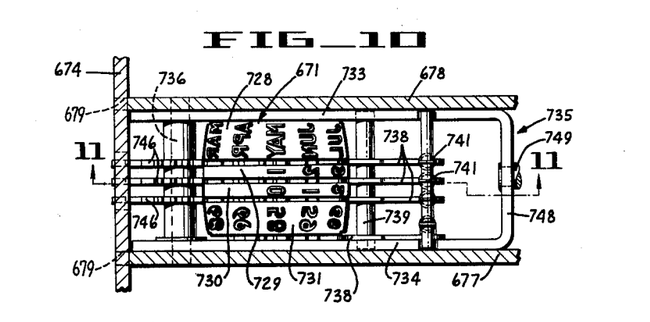
FIG. 10 is a sectional plan view of the auxiliary print head showing the dater die wheels, the view taken on the line 10—10 in FIG. 9.
Figure 11:
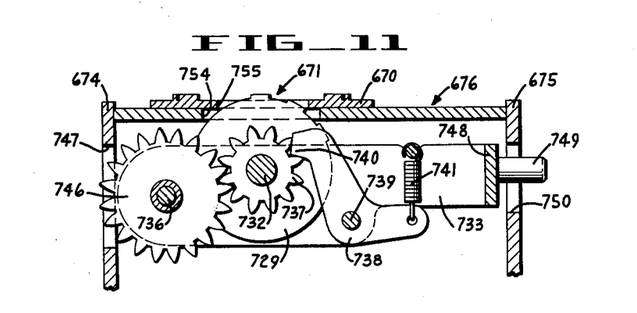
FIG. 11 is a sectional elevational view of the dater die mechanism taken on the lines 11—11 in FIG. 10.

The dater die wheel 671 may be selectively moved into, or out of, the printing position shown in FIGS. 9, 10 and 11 by an adjustment of the yoke 735. Each leg 733 and 734 of the yoke 735 lies adjacent the respective legs 678 and 677 of U-shaped member 676 and are rockably mounted, adjacent the open end of the yoke 735, on shaft 736. The cross-member 748 of the yoke 735 carries a pin 749, centrally located thereon and extending through a vertically disposed slot 750 in the end frame, or disk, 675 of the auxiliary print head 565, to control the movement of the dater dies 671 from the print to the non-print position. The pin 749 on the yoke 735 is normally urged toward the upper end of the slot 750, as viewed in FIGS. 9 and 11, by means of a spring 751. At its one end, spring 751 is supported on the shaft 720 and at its other end is secured on a pin 752 (FIGS. 3, 5 and 9) carried on the lower end of a depending portion 753 of arm 734 of yoke 735. In the print position of the yoke, or carriage, 735 (FIGS. 3, 9 and 11), a portion of the type die wheels 728 to 731, inclusive, extends through a suitable rectangular aperture 754 in the web portion 685 of the U-shaped frame 676 and also extends into a mating rectangular aperture 755 centered within the town circle die 670, so that the printing surface of the exposed type characters on the selectively adjusted wheels is flush with the printing surface of the town circle die 670, as viewed in FIG. 5.

Figure 2:
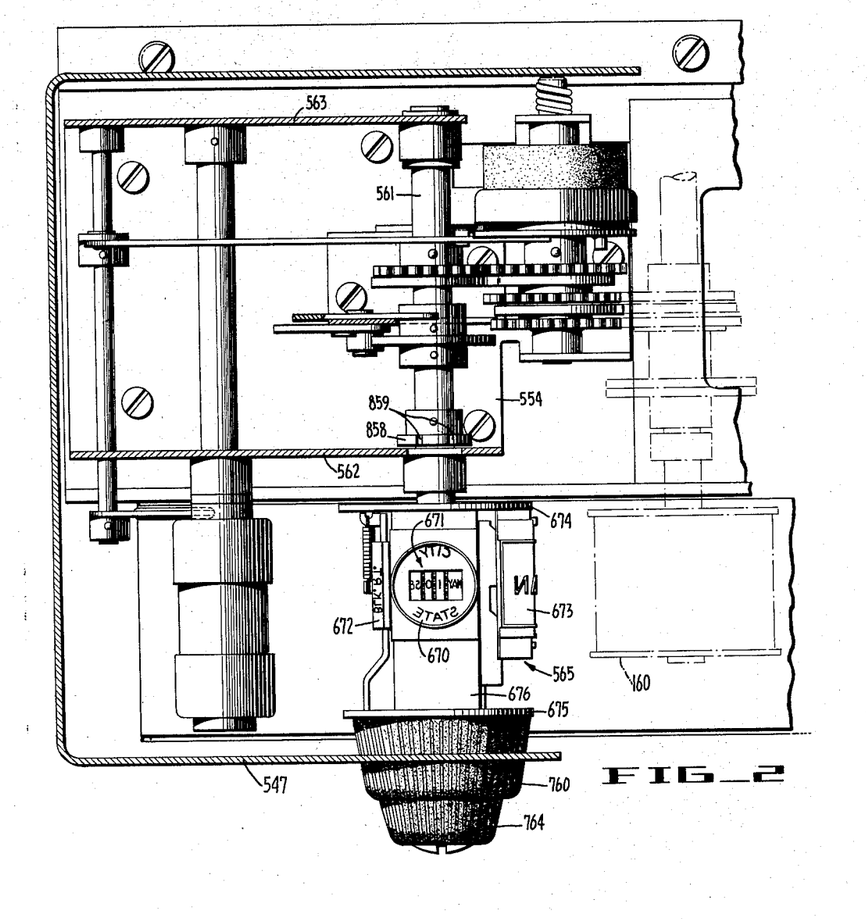
FIG. 2 is a sectional plan view of the main drive clutch-controlled driving mechanism and the driven shaft supporting the auxiliary print head.

As explained above, the dater dies 671 and the "Bulk Rate" die 672 may be selectively moved into the print or non-print position and for this purpose a knurled knob 760 is rotatably mounted on the outer extended end of the reduced diameter of the shaft 561. The knob 760 (FIGS. 3, 4, 9 and 13) is mounted on the extended end of the shaft 561 adjacent the outer surface of the frame 675 of the auxiliary printing head 565 and is secured in place thereon by a washer 761 (FIG. 9) and a spring clip 762 engaged in an annular groove in the shaft 561. A counterbored opening 763 is provided in the end surface of the knurled knob 760 and is adapted to receive the inner end portion of a smaller knurled knob 764. The inner end surface of knob 764 is counterbored to accommodate the washer 761 and spring clip 762 and the outer end surface is provided with a counterbored opening 765 which is adapted to receive a nut 766 having a screw driver slot therein. The knob 764 is freely mounted on the extended end of the shaft 561 and the inner end surface thereof is retained in contiguity with the bottom of the counterbore 763 by the application of the nut 766 on the thereaded end portion of the shaft 561. As seen in FIG. 2, a substantial portion of the knob 760 and the knob 764 extends beyond the outer surface of the machine cover 547 for selective manual control, or manipulation, by an operator. Each of the knobs 760 and 764 may be independently rotated in either direction from one extreme position to the other extreme position, the knob 760 having four positions and the knob 764 having but two positions.

In the extreme counter-clockwise position of the knob 760, as viewed from the right in FIG. 9, the "Bulk Rate" die 672 is moved to its non-print position and the dater dies 671 are moved to the print position. Upon clockwise rotation of the knob 760 to its second position, the "Bulk Rate" die 672 and dater dies 671 are both in the print position thereof. As the knob 760 is turned clockwise to its third position, the "Bulk Rate" die 672 remains in its print position while the dater dies 671 are rocked downwardly to the non-print position. Upon rotation of the knob 760 to its extreme clockwise position, both the "Bulk Rate" die and the dater dies 671 are in their non-print position. To control the adjustment of the dater dies 671 into, or out of, the print position, the pin 749 on the carriage 735 extends through the radially disposed slot 750 in the end frame 675 and into a camming slot 770 formed in the inner surface of the knurled knob 760 (FIGS. 9 and 13). The camming slot 770 is comprised of two arcual end positions 771 and 772 joined together by an inclined, or angularly disposed, portion of the slot, the arcual portion 771 having a greater radius than that of the arcual portion 772. The arcual portions 771 and 772 are of an equal length such that, upon rotation of the knob 760 from one extreme position to the second position, the carriage 735 will remain in one adjusted position thereof. However, upon rotation of the knob 760 from the second to the third position, the carriage 735 will be adjusted to its other position and will remain there upon rotation of the knob from the third to the fourth, or other extreme, position thereof. The adjustment of the "Bulk Rate" die 672 is controlled simultaneously with that of the dater dies 671 and, for this purpose, a tongue-like projection 773 on the rightmost offset end of the slide 693 (FIGS. 3 and 4) extends parallel with slide 693 through a suitable rectangular aperture 774 in end frame 675 and into an arcuate slot 775 in the inner surface of the kob 760. The spring 697 normally urges slide 693 to the right to retain the round end of the tongue-like projection 773 in engagement with the contoured bottom of the arcuate slot 775, the configuration of which is shown in its developed form in FIG. 15. At its extremities, the slot 775 is of an equal depth, which is greater than the depth of the intermediate portion of the slot in which two spaced-apart indentations are formed to represent the second and third positions of the knob 760.

As stated above, in the extreme counter-clockwise position of the knob 760, as viewed from the right in FIG. 9 or from the left in FIG. 12, the dater dies 671 will be in the print position while the "Bulk Rate" die 672 will be in its non-print position. In this position of the knurled knob 760, the pin 749 on the carriage 735 will be positioned in the extreme end of the arcual portion 771 of camming slot 770, while the tongue 773 will be in the extreme position in slot 775 (FIGS. 13 and 15), i.e., the leftmost and deeper depression therein. Upon one step of rotation in a clockwise direction of the knob 760, the dater dies 671 will remain in the first described position, while the "Bulk Rate" die 672 will be moved to its print position, wherein the pin 749 on carriage 735 and the tongue 773 of the slide 693 will be in the relative positions indicated in FIGS. 13 and 15. The selective combinations of the print and non-print positions of the dater dies 671 and "Bulk Rate" die 672 meet all U.S. Government requirements for the various classifications of mail matter.

The slogan die plate may be detached and replaced by a die plate representing any desired slogan and may also be selectively moved into its print or non-print position. A round end projection 776 is carried by, and extends outwardly from, the left end of the web portion 722 of the channel slide 713 (FIGS. 12 and 14) through a suitable rectangular aperture 777 in the end frame 675 and through an arcuate clearance slot 778 (FIG. 13) in knurled knob 760 to engage in an arcuate slot 779 in the inner surface of the knurled knob 764. The rounded end of the projection 776 on the channel slide 722 is retained in engagement with the contoured bottom surface of the arcuate slot 779 by means of spring 719 (FIG. 3). In the extreme counter-clockwise position of the knob 764, as viewed from the left in FIG. 12, the nose of the projection 776 rests in a shallow depression in the slot 779 and the channel slide 713 is moved to the right in FIG. 12 or to the left to the position shown in FIG. 3 wherein the slogan die plate 673 is moved outwardly to its print position. Upon turning the knob 764 in a clockwise direction, as viewed from the left in FIG. 12, the spring 719 urges the channel slide 713 to the left, the extent of its movement determined by the deepest portion of the slot 779. Under this condition, the spring 712 urges the slogan die plate 673 inwardly to the non-print position indicated by phantom line in FIG. 5.

Dater Dies Selection Mechanism

Figure 18:
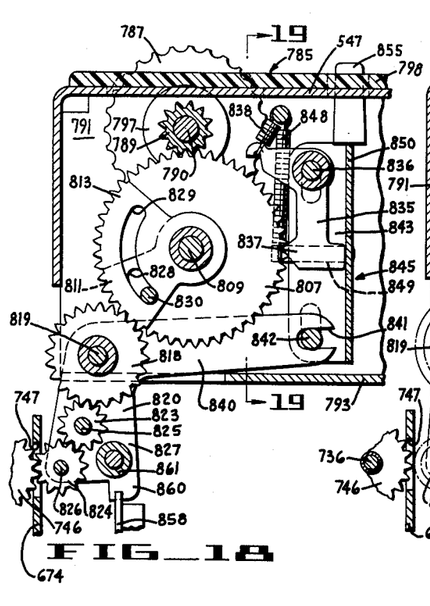
FIG. 18 is a view similar to FIG. 17, except that the selector lock key is in depressed position to connect the selection mechanism with the dater dies.
Figure 19:
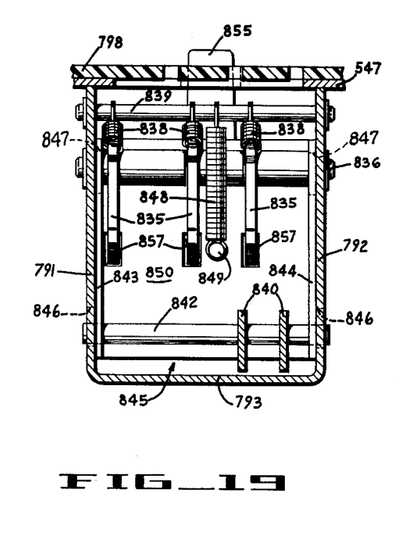
FIG. 19 is a sectional elevational view of the dater die selector mechanism, the view being taken on line 19—19 in FIG. 18.
Figure 20:
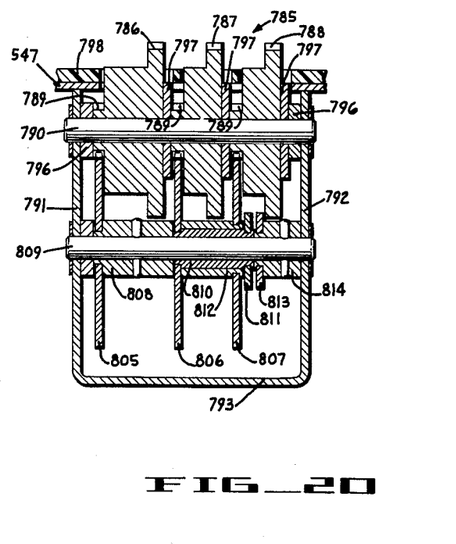
FIG. 20 is a view of the dater die selector mechanism taken on the plane indicated by line 20—20 in FIG. 17.

The dater dies selection mechanism is mounted as a unit 785 within the cover 547 of the main drive housing 15 (FIGS. 17, 18, 19 and 20). The month type die wheel 728, the day tens type wheel 729 and the day units type wheel 730 of the dater dies 671 (FIG. 10) are selectively adjusted by a differential rotation of the respective selector wheels 786, 787 and 788 (FIG. 20). In the embodiment shown, each of the wheels 786, 787 and 788 is preferably molded of a thermoplastic material and has a hub and a twelve-tooth gear 789 integrally formed therewith. The wheels 786, 787 and 788 are rotatably mounted on a shaft 790 secured at its ends, by means of spring clips, in respective spaced-apart parallel frame members 791 and 792 formed upwardly at a right angle to a supporting plate 793. The dater dies selection unit 785 is suitably supported within the postage metering device by securing the plate 793 on a horizontally disposed plate supported on the parallel vertical extensions 562 and 563 of the bracket 554. Wheel 786 and the integrally formed gear 789 thereon is spaced from the adjacent frame member 791 by a collar 796. A similar collar 796 and a disk 797 are interposed between selector wheel 788 and the adjacent frame member 792. The selector wheel 787 is equally spaced from the adjacent wheels 786 and 788 by similar disks 797 on shaft 790. A portion of each of the wheels 786, 787 and 788 extends through a suitable aperture in the cover 547 and also through a corresponding aperture in a cover panel 798 which, in the embodiment shown, is of a decorative thermoplastic material molded or otherwise secured on the top surface of the cover 547.

The months of the year are engraved at equiangularly spaced intervals on the peripheral surface of the hub portion of wheel 786, while the numerals "1" to "3" are engraved on the peripheral surface of the hub portion of the wheel 787 and the numerals "1" to "0" are engraved upon the hub portion of the wheel 788. The angular spacing of the numerals on each of the wheels 787 and 788 is in accordance with the spacing of the months on the hub of the wheel 786. The top surface of the cover panel 798 is substantially tangential with the hub portions of the wheels 786, 787 and 788 and the shape of the aperture therein for each wheel conforms with that portion of the corresponding wheel and hub 786, 787 and 788 which extends above the upper surface of the cover 547 so that only the engraved character indicating the selected adjusted position of each of the wheels is visual.

Referring now to FIGS. 17, 18 and 20, the twelve-tooth gears 789 integral with the wheels 786, 787 and 788 are meshed with the respective forty-eight-tooth gears 805, 806 and 807. The gear 805 is carried on a hub 808 pinned on a shaft 809 which is journalled at its respective ends in frame members 791 and 792. The forty-eight-tooth gear 806 is secured on one end of a sleeve 810 journalled on shaft 809, which sleeve 810, at its other end, carries a six-tooth sector 811. The forty-eight-tooth gear 807, enmeshed with the twelve-tooth gear 789 on selector wheel 788, is secured on one end of a sleeve 812 rotatably mounted upon sleeve 810 between gear 806 and sector 811. A fourteen-tooth sector 813 is secured on a hub 814 which is pinned on shaft 809 between frame member 792 and sector 811. The forty-eight-tooth gear 807, the six-tooth sector 811 and the fourteen-tooth sector 813 are equally spaced in accordance with the spacing between the gears 746 enmeshed with the gears 737 of the dater dies 671 (FIGS. 10 and 11). Gear 807, sector 811 and sector 813 mesh, respectively, with a corresponding one of three twenty-four-tooth gears 818, rotatably mounted on a shaft 819 secured at its respective ends in frame members 791 and 792 (FIGS. 17 and 18). The gears 818 are equally spaced on the shaft 819 and are positioned between a pair of similar bellcranks 820 rockably mounted on shaft 819 for adjustment to either an active or inactive position. The gears 818 mesh with twelve-tooth gears 823 which, in turn, are meshed with similar twelve-tooth gears 824. The gears 823, driven by corresponding gears 818, are rotatably mounted upon a shaft 825, while the gears 824, driven by gears 823, are rotatable upon a shaft 826 and, upon movement of the bellcranks 820 to active position, provide an operative connection between the selection wheels and the gears 746 associated with the date type wheels. The shafts 825 and 826 are in parallelism with each other and with shaft 819 and are secured at their respective ends in the similar depending arms 827 of positionable bellcranks 820.

In the arrangement shown in FIGS. 17 and 20, each 30° angular rotation of the month selector wheel 786 imparts one increment of rotation to the corresponding twelve-tooth gear 824 through sector 813. Similarly, each 30° angular rotation of the day tens selector wheel 787 imparts an increment of rotation to the corresponding twelve-tooth gear 824 through sector 811 and, in a like manner, each 30° angular rotation of the day units selector wheel 788 imparts an increment of rotation to the corresponding gear 824 through the gear 807. As shown, gear 807 may be revolved through 360°, whereas rotation of the month selector wheel 786 is limited to twelve angular adjustments thereof and the day tens selector wheel 787 is limited to three angular adjustments. The extent of the adjustment of each of selector wheels 786 and 787 in either direction is determined by the engagement of one extremity or the other of the arcual slots 828 and 829, formed in respective sectors 811 and 813, with a pin 830 secured on frame member 792. Each of the selector wheels 786, 787 and 788 is resiliently retained in each angularly adjusted position thereof by means of detent pawls 835 (FIGS. 17, 18 and 19), rockably mounted upon a shaft 836, secured at its ends in respective frame members 791 and 792. The detent pawls 835 are spaced on shaft 836 for cooperation with the gears 805, 806 and 807 and each pawl is provided at its lower end with a V-shaped nose 837 which is resiliently urged by means of an associated spring 838 into engagement between adjacent teeth on the corresponding gear. Each spring 838 is secured at its lower end on the hook end of an arm of the associated detent pawl 835 and is supported at its upper end on a shaft 839 secured at its ends in respective frame members 791 and 792.

It will be noted that following each cycle of meter operation, the postage indicia print head 169 is in the full-cycle position. Likewise, the auxiliary print head 565 is in the full-cycle position shown in FIGS. 2 and 17, wherein the dater dies 671 are 180° out of printing position and the gears 746 are aligned with the corresponding gears 824 of the dater dies selection mechanism which are actively settable for engagement therewith, if desired. In order to selectively adjust the type wheels 728, 729 and 730 of the dater unit 671, the gears 824 are rocked from the inactive position shown in FIG. 17 to the active position shown in FIG. 18 wherein the gears 824 mesh with the corresponding gears 746. For this purpose, each of the substantially horizontally disposed arms 840 of the similar spaced-apart parallel bellcranks 820 is provided at its end with a bifurcation 841 engaged with a shaft 842, which is supported adjacent its ends in apertures in the lower portion of respective flanges 843 and 844 of a chanelled slide 845 (FIGS. 17, 18 and 19). The slide 845 is mounted for endwise movement between frame members 791 and 792 to control the rocking movement of the parallel bellcranks 820, moving the gears 824 into, or out of, engagement with gears 746. The outer surface of each of the flanges 843 and 844 of the slide 845 lies adjacent the inner surface of the respective frame members 791 and 792. Each end of the shaft 842 is extended to engage in a vertically disposed elongated slot 846 in each frame member 791 and 792 and serves to guide the lower end of the slide 845 in its endwise movement. At its upper end, the slide 845 is also guided in its movement by the engagement of shaft 836 in each of similar elongated slots 847 in respective flanges 843 and 844 of the slide. Slide 845 and therefore gears 824 are normally urged to the inactive position shown in FIG. 17 by a spring 848 which is supported at its upper end on shaft 839 and at its lower end on a stud 849 secured on the web portion 850 of the slide 845. A button, or key top, 855 is secured on a vertical extension of the web 850 of slide 845 and extends upwardly through a suitable aperture in the cover 547 and a mating aperture in the cover panel 798. As seen in FIG. 18, upon the manual depression of key 855, slide 845 is moved downwardly against the urgency of the spring 848, thereby rocking gears 824 into engagement with the corresponding gears 746 in the auxiliary print head 565.

Inasmuch as the auxiliary print head 565 is enclosed within the cover 547, an operator must relay on the indication shown by the adjustment of the selector wheels 786, 787 and 788 to determine the setting of the dater die wheels 728, 729 and 730, respectively. Therefore, means are provided which prevent adjustment of the selector wheels 786, 787 and 788 when the auxiliary print head 565 is out of its full-cycle position. In the normally inactive position of the slide 845, as seen in FIG. 17, the end of a lateral projection 856 on the lower end of each of the detent pawls 835 abuts the inner surface of the web portion 850 of the slide 845. The nose 837 of each of the pawls is thereby locked between adjacent teeth of the corresponding gears 805, 806 and 807. However, a vertically disposed rectangular aperture 857 (FIG. 19) is provided for each pawl 835 in the web portion 850 of the slide 845 and is normally positioned above the lateral extension 856 of each pawl. Upon depression of key 855, the apertures 857 are moved downwardly into position to receive the lateral extension 856 of the pawls 835, thereby permitting the nose 837 of each pawl to ratchet over the teeth of the corresponding gear 805, 806 and 807 during the selective adjustment of the respective selector wheels 786, 787 and 788. Thus, it becomes apparent that an adjustment of a selected wheel, or wheels, 786, 787 and 788 may be made only while the key 855 is held depressed to retain the slide 845 in its downward position.

If the key 855 and the slide 845 are locked against depression, the selector wheels 786, 787 and 788 cannot be adjusted and the bellcranks 820 cannot be rocked to enmesh the gears 824 with the gears 746. To assure correct alignment of the gears 746 for engagement by the corresponding gears 824, a pair of spaced parallel notches 859 are formed in the flanged collar 858 (FIG. 2) secured on shaft 561. The notches 859 are disposed on chords equally spaced either side of the axis of the shaft 561 and the spacing between the notches is identical to the spacing between similar projections 860 on the lower end of each of the arms 827 of bellcranks 820. Accurate spacing between the arms 827 of the bellcranks 820 is maintained by means of a spacer 861. In the full-cycle position of the auxiliary print head 565 and upon clockwise rocking movement of the bellcranks 820 by depression of key 855 (FIG. 18), the projections 860 enter the aligned notches 859 in the flange of the collar 858. Upon engagement of the projections 860 in the corresponding notches 859, shaft 561 will become locked against rotation, thereby precluding an inadvertent attempt to initiate operation of the meter device. The width of each of the notches 859 in the flanged collar 858 is sufficient only to permit the entry of the corresponding projections 860 thereinto. Therefore, should the auxiliary print head 565 be displaced from its full-cycle position, the leading edges of the projections 860 will engage the flange of the collar 858, thereby preventing, or blocking, the downward movement of the slide 845 and an adjustment of the selector wheels 786, 787 and 788. Hence, the date registered on the dater die wheels 671 will invariably be that indicated in the dater die selection mechanism 785.

As explained hereinbefore, inasmuch as the year type wheel 731 of the dater die unit 671 is adjusted but once a year, the meter unit 20 is removed and the print head 565 is revolved approximately 270° to position the dater die unit 671 in a suitable opening provided in the cover 547, wherein the type wheel 731 may be adjusted by means of a stylus. The auxiliary print head 565 is thereafter returned to its full-cycle position and the meter unit 20 is replaced for use in the postage metering device.

I claim:

1. In a postage metering device, a frame, a printing drum mounted for actuation within said frame, a town printing die member secured on said printing drum and movable to printing position upon actuation of said printing drum, a plurality of angularly settable dater type die wheels coaxially mounted side-by-side within said town printing die, means mounted on said frame selectively settable to represent a date, means normally operable to prevent setting of said settable means, means normally disengaged from said dater type wheels rockable to operatively engage said dater type die wheels with said settable means for control thereby, and means manually operable to disable said preventing means and to rock said rockable means to the engaged position thereby enabling operation of said settable means to angularly adjust said dater type wheels.

2. In a postage metering device, a frame, a printing drum mounted for cyclic rotation from a full-cycle position in said frame, a town circle printing die secured on said printing drum operable to effect an impression with each cyclic rotation of said drum, an auxiliary frame member mounted in said printing drum rockable to either of two positions, a series of dater die wheels mounted for angular adjustment within said auxiliary frame member and movable between a print and non-print position relative to said town circle die upon rocking movement of said auxiliary frame, dater selection means mounted on said frame selectively settable to represent a date, a positionable means engaged with said selection means and normally disengaged from said dater die wheels operable upon movement from the disengaged to an engaged position to effect engagement of said selection mechanism with said dater die wheels to enable an adjustment of said wheels, normally operable lock means for preventing the setting of said selection means, a manually operable key, means controlled by the operation of said key for disabling said lock means and rendering said connecting means operative, a cyclic lock means for said key operable in the full-cycle position of said printing drum to enable the manipulation of said key for adjustment of said dater die wheels in accordance with the setting of said selection means, and a manually controlled means mounted on said printing drum rotatable to each of a plurality of positions to control the rocking movement of said auxiliary frame member for the movement of said dater die wheels between the print and non-print position.

3. In a postage metering device, a frame, a printing drum mounted for rotation within said frame to effect printing, a printing die member secured on said printing drum effective to print a town circle upon rotation of said printing drum, a series of dater type die wheels coaxially mounted in said printing drum for independent angular adjustment within said printing die member movable between a print and non-print position, means mounted on said frame selectively settable to represent a date, means for effecting adjustment of said dater die wheels rockable from a normally inoperative position to an operative position relative to said printing drum to enable angular adjustment of said dater type die wheels by said settable means, a locking means normally operable to prevent setting of said settable means, a manually controlled means operable to rock said rockable means to the operative position and to simultaneously disable said locking means thereby enabling operation of said settable means, and a manipulative means cooperating with said drum operable to control movement of said dater type die wheels between the print and non-print position.

4. In a postage metering device, a frame, a printing drum mounted for cyclic rotation in said frame, a series of dater die wheels in said printing drum adjustable to a print or non-print position, each said die wheel being angularly adjustable to a plurality of positions to effect printing upon each rotation of said drum and the adjustment of said series of dater die wheels to the print position, a plurality of members, one for each of said dater die wheels mounted on said frame adjacent said printing drum selectively settable to represent a date, adjustable means movable from a normally inoperative to an operative position to engage said settable members with said dater die wheels for control of the angular adjustment of said wheels in accordance with the setting of said settable members, means for preventing the setting of said settable members, a manipulable member operative upon operation thereof to move said adjustable means to the operative position and to disable operation of said preventing means thereby enabling adjustment of said dater die wheels by said settable members, and a manual control means selectively operable to effect an adjustment of said series of dater die wheels to either the print or non-print position.

5. In a postage metering device, a frame, a printing drum mounted for cyclic rotation in said frame, a series of dater type die wheels in said printing drum adjustable to either a print or non-print position, each of said wheels adjustable to a plurality of angular positions to effect printing upon adjustment of said dater die wheels to the print position and the subsequent rotation of said printing drum, detent means for resiliently retaining each of said die wheels in each angularly adjusted position, a plurality of date selection members mounted on said frame adjacent said printing drum, one said member for each of said wheels selectively settable to represent a portion of a date, a connecting means interposed between said selection members and said wheels rockable from a normally inoperative to an operative position to enable the adjustment of said wheels by said selection members in accordance with the setting thereof, a manipulative means for controlling the selective adjustment of said series of dater die wheels to a print or non-print position, manually controlled means operable to rock said connecting means, locking means for said selection members rendered inoperative upon operation of said manually controlled means to enable setting of said selection members, and means operable to prevent rocking of said connecting means and operation of said manually controlled means in other than the full-cycle position of said printing drum.

6. In combination with a rotatable printing member; printing dies in said printing member adjustable to represent data to be printed and movable to either a print or non-print position, manually operable means for selectively controlling movement of said printing dies to the print or non-print position, selectively settable means normally disengaged from said printing dies to enable unrestrained rotation of said printing member and operable upon engagement with said dies to control the adjustment thereof, manipulative means operable upon operation thereof to engage said settable means with said printing dies, lock means normally operative to prevent setting of said settable means disabled upon operation of said manipulative means, and a blocking means for preventing operation of said manipulative means during actuation of said printing member.

7. In combination with a rotatable printing member; a series of printing die members in said printing member movable to either a print or non-print position, each of said die members being adjustable to each of a plurality of positions for printing with each actuation of said printing member subsequent to the movement of said die members to the print position, manually operable means for controlling the movement of said die members, means carried by said printing member for enabling adjustment of said die members, a plurality of selection means, one for each of said die members selectively settable to represent data to be printed, means controlled by said selection means rockable from an inoperative to an operative position to engage said selection means with said printing die members for effecting adjustment of each of said die members in either the print or non-print position thereof and in accordance with the setting of the corresponding one of said selection means, a depressible key operable upon depression thereof to rock said controlled means to the operative position, locking means for said selection means enabled by said key in the nondepressed position thereof and operable upon depression of said key to enable setting of said selection means, and blocking means effective upon actuation of said printing member to prevent rocking of said controlled means and depression of said key.

References Cited in the file of this patent
UNITED STATES PATENTS

| | | |
|---|---|---|
| 2,516,920 | Ryan et al. | Aug. 1, 1950 |
| 2,690,710 | Aurbach | Oct. 5, 1954 |
| 2,726,812 | Uhl | Dec. 13, 1955 |
| 2,816,503 | Heil | Dec. 17, 1957 |